Aug. 28, 1923.
C. A. HARTLEY ET AL
GRADER
Filed Nov. 13, 1922
1,466,015
8 Sheets-Sheet 1
FIG-1-
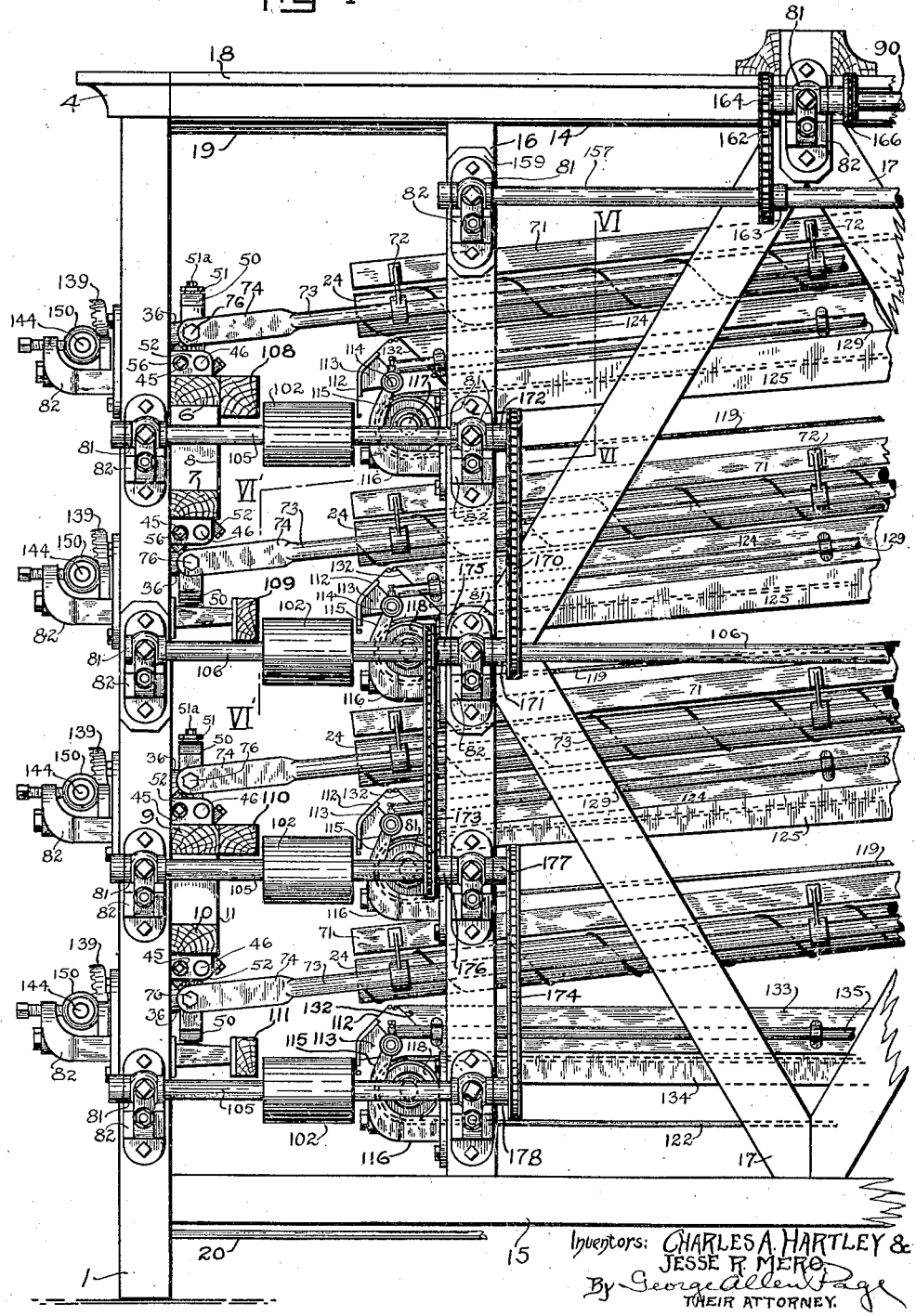
Inventors: CHARLES A. HARTLEY &
JESSE R. MERO
By George Allen Page
THEIR ATTORNEY.

Aug. 28, 1923.
C. A. HARTLEY ET AL
1,466,015
GRADER
Filed Nov. 13, 1922     8 Sheets-Sheet 2
Fig-2-
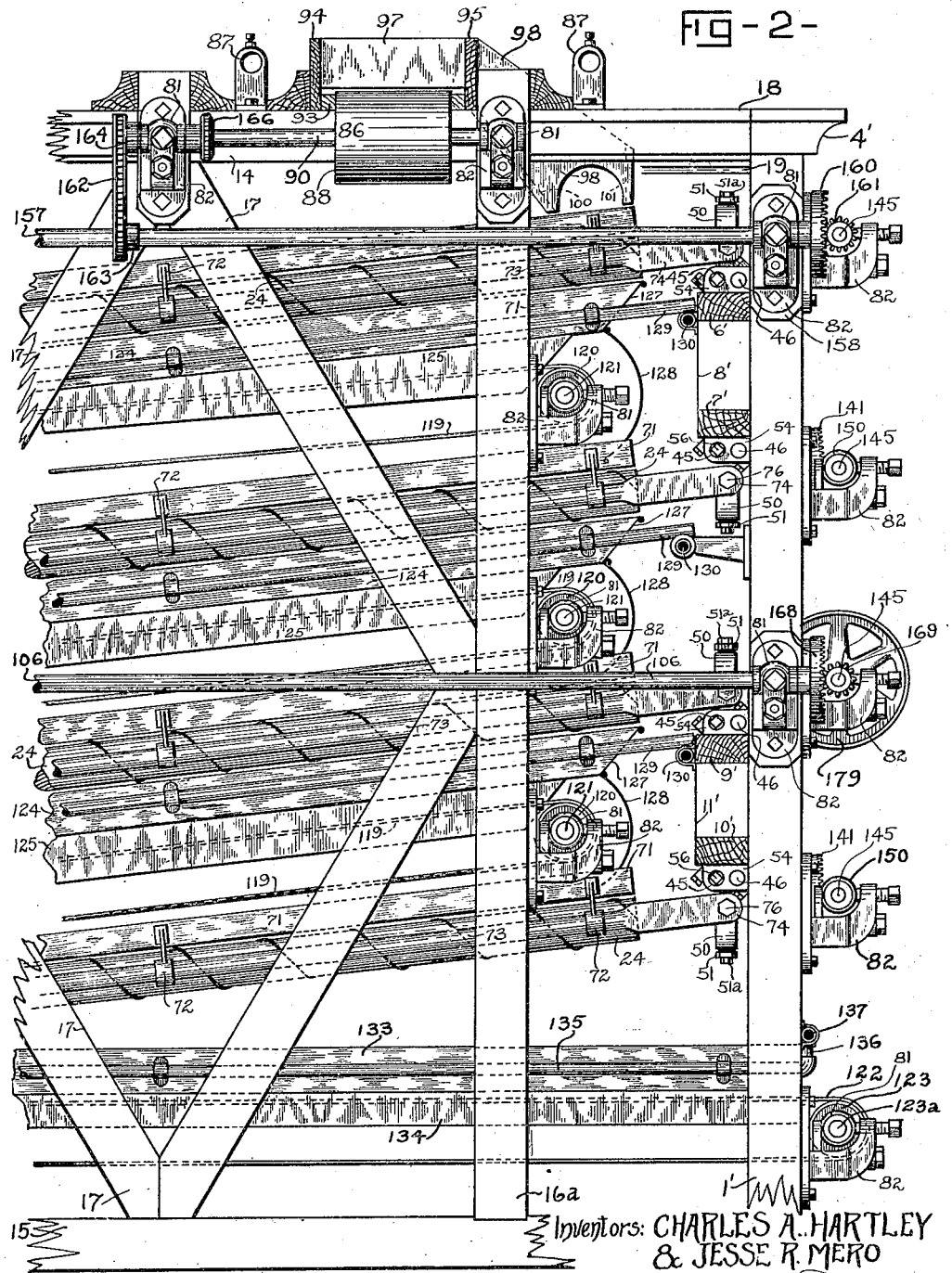
Inventors: CHARLES A. HARTLEY
& JESSE R. MERO
BY George Allen Page
THEIR ATTORNEY

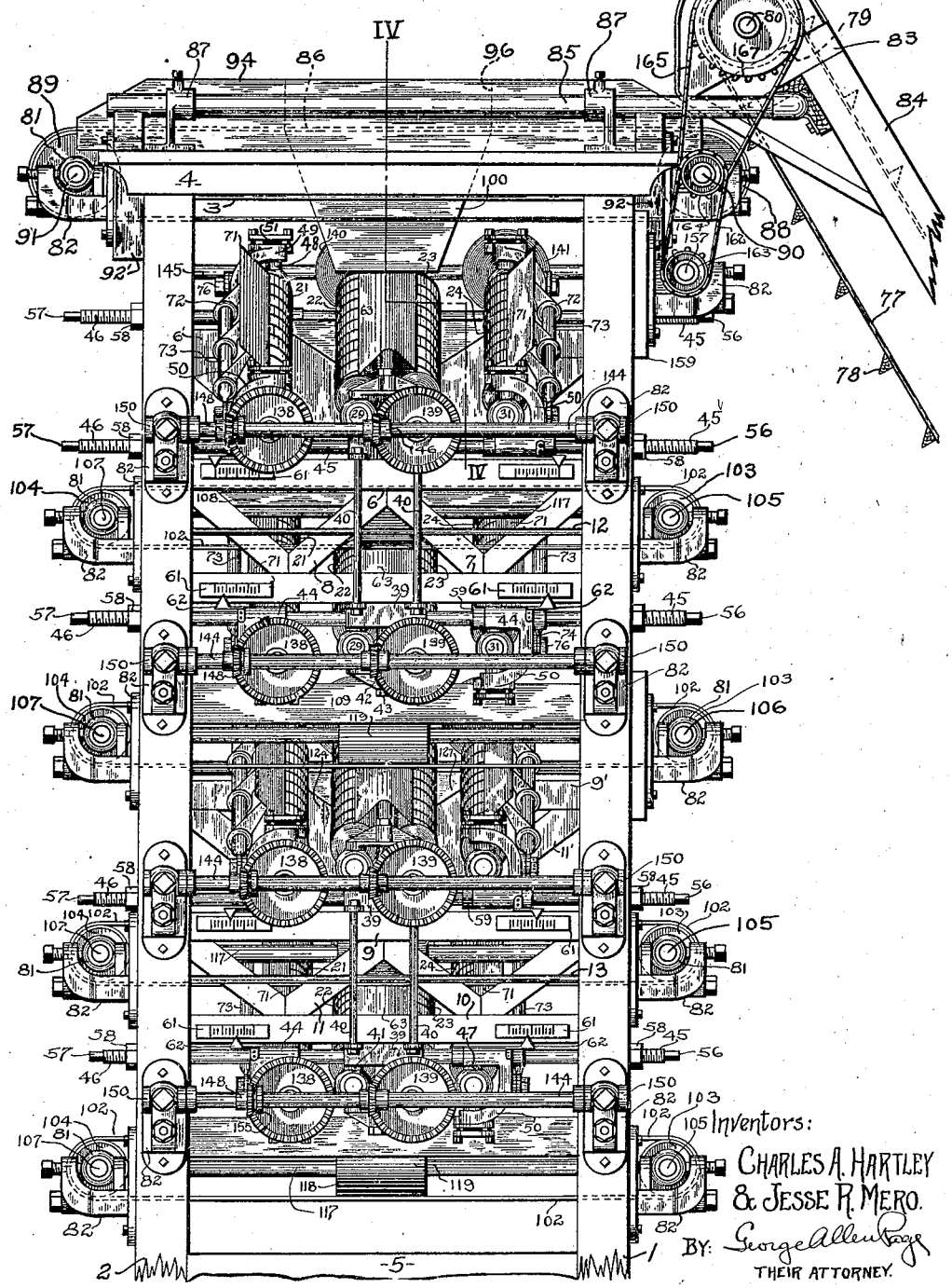

Aug. 28, 1923.
C. A. HARTLEY ET AL
1,466,015
GRADER
Filed Nov. 13, 1922     8 Sheets-Sheet 4
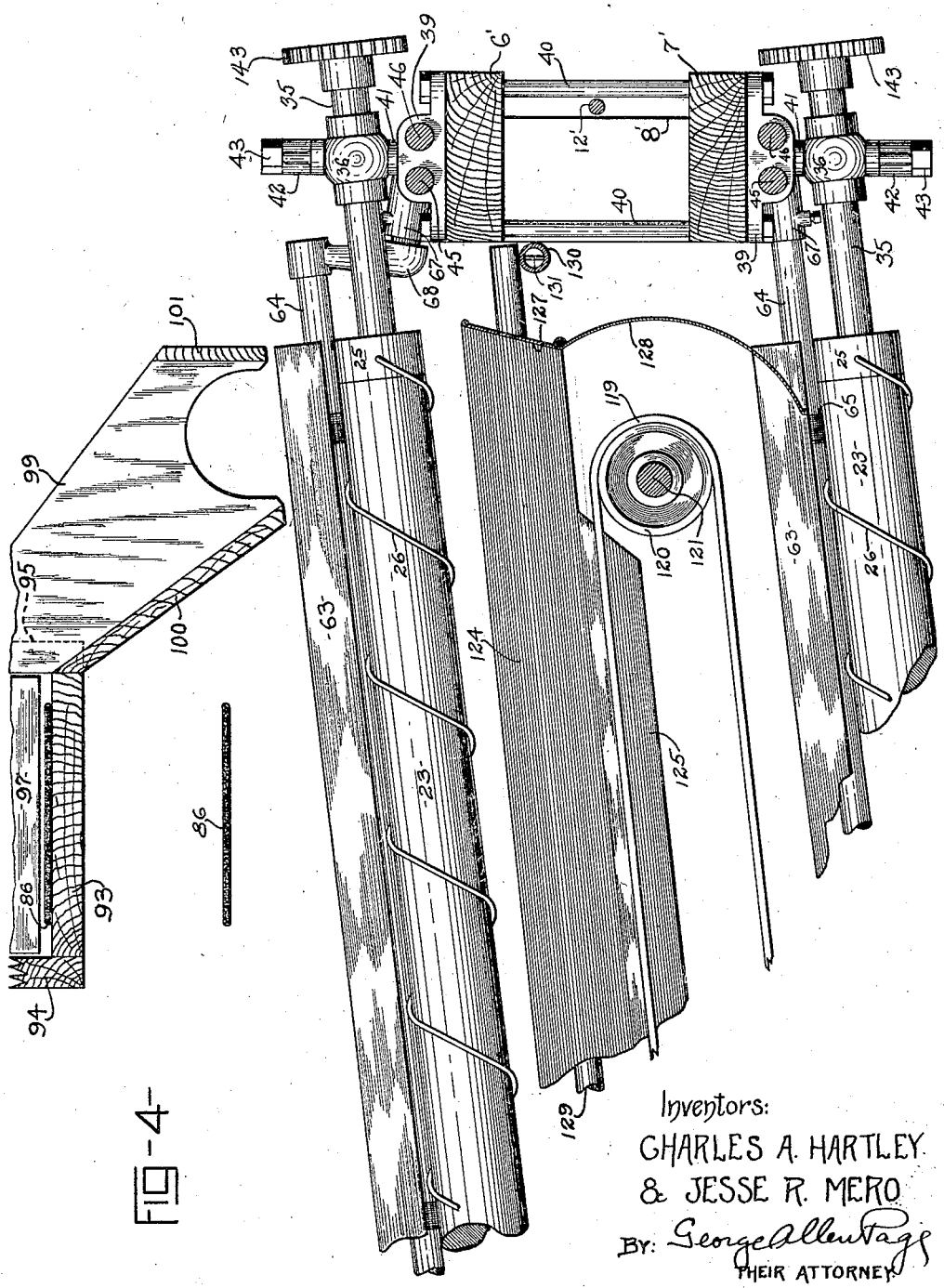
Inventors:
CHARLES A. HARTLEY
& JESSE R. MERO
BY: George Allen Page
THEIR ATTORNEY

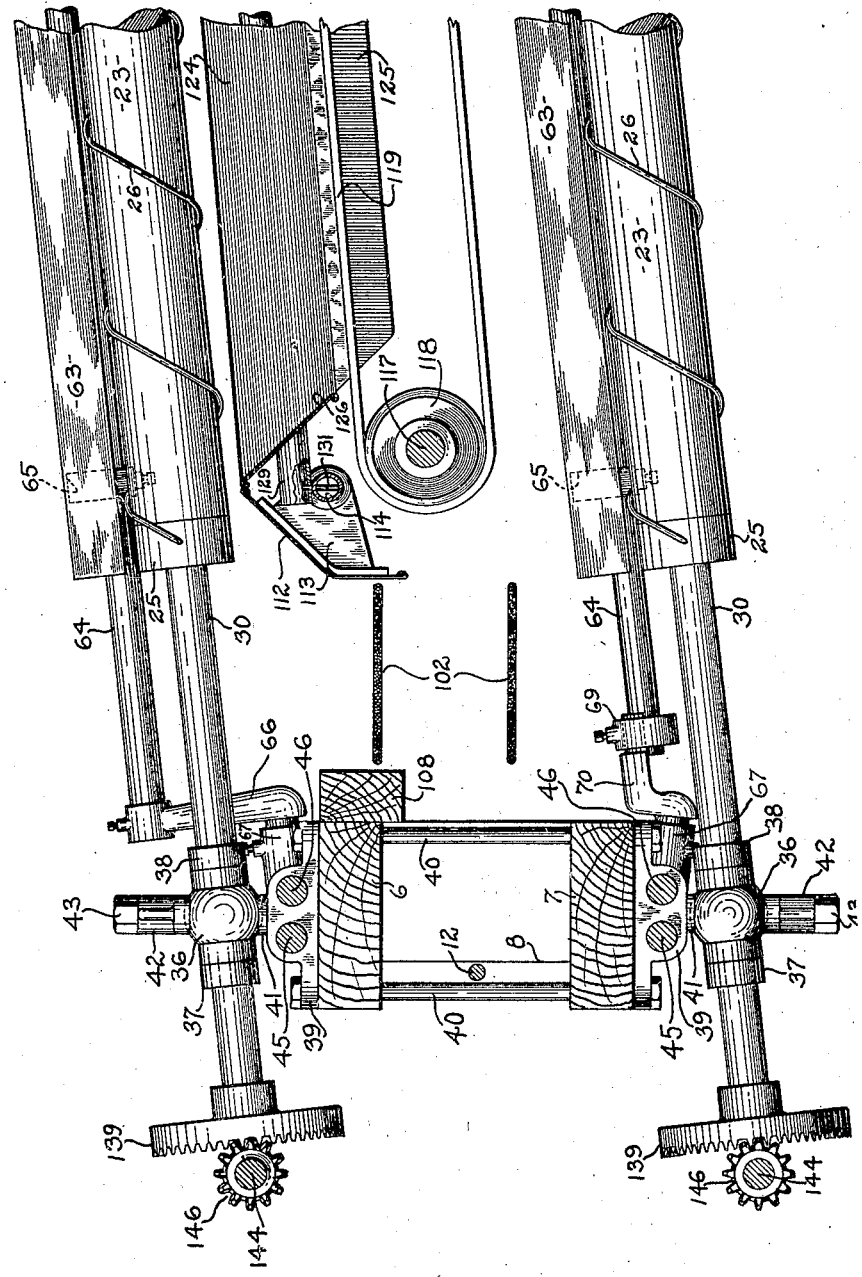

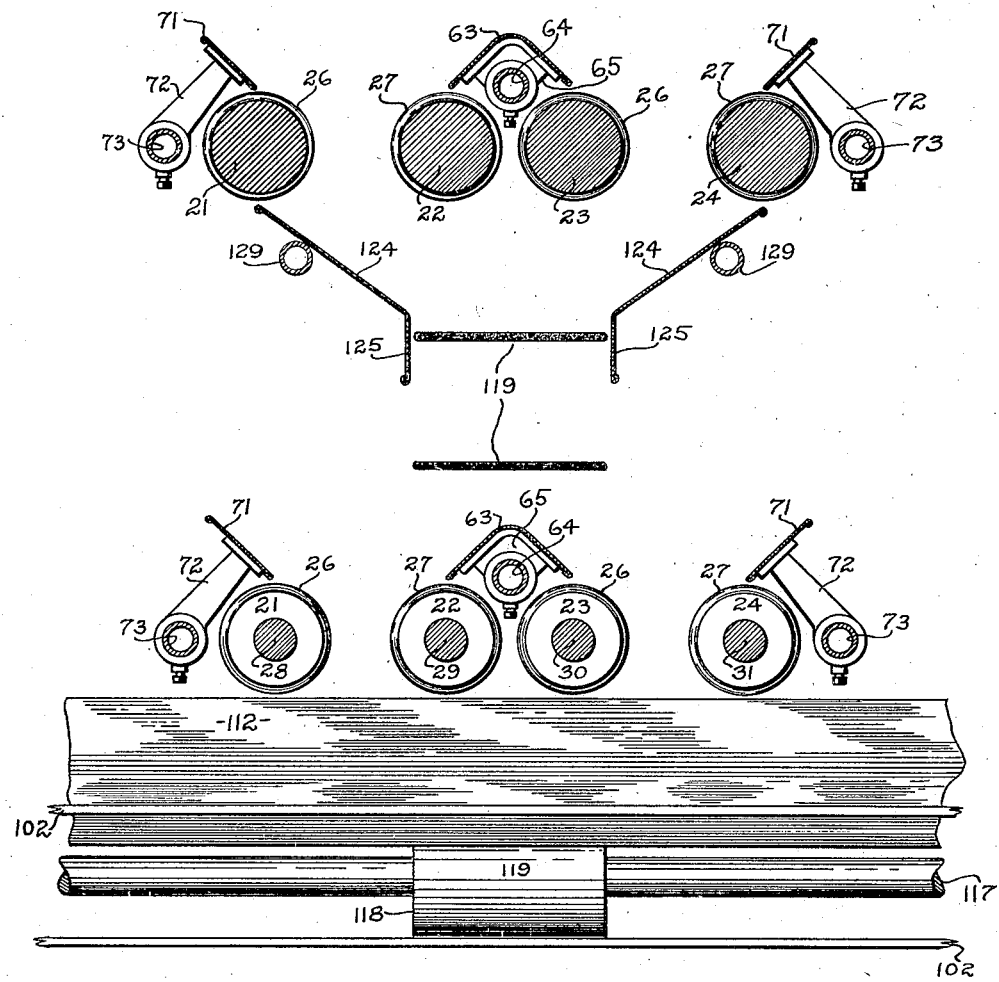

Aug. 28, 1923.                                                    1,466,015
C. A. HARTLEY ET AL
GRADER
Filed Nov. 13, 1922          8 Sheets-Sheet 7
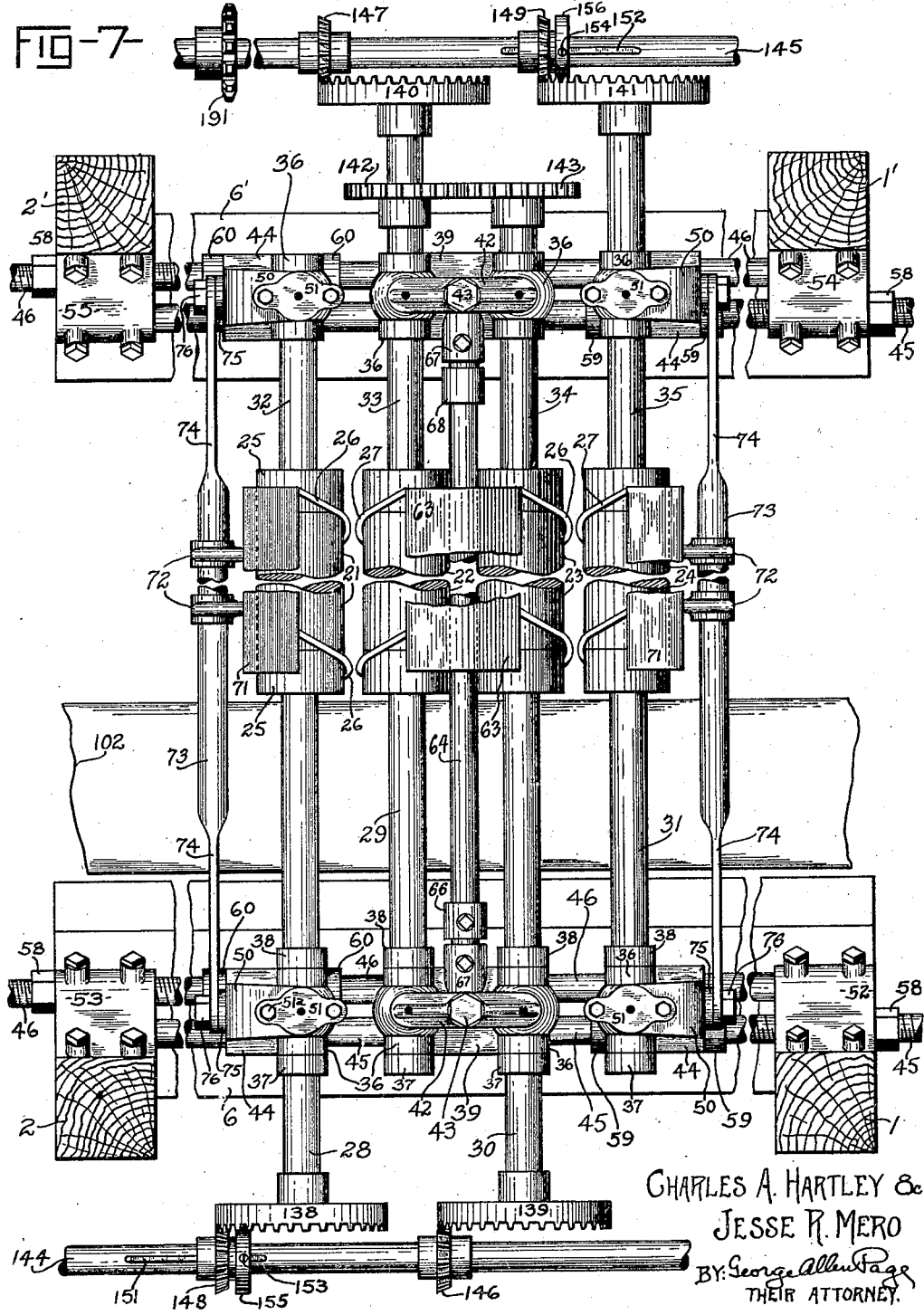

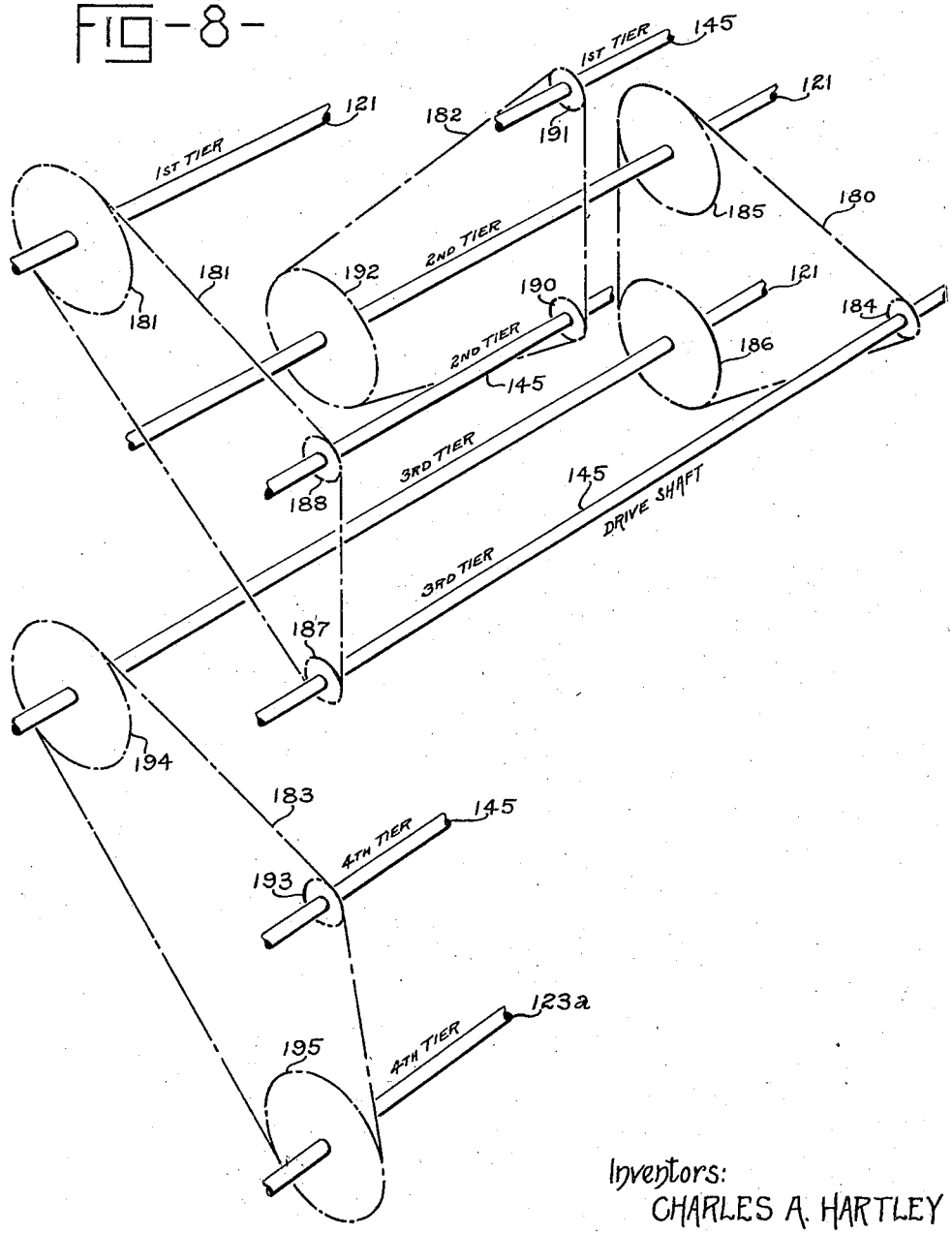

Patented Aug. 28, 1923.

1,466,015

UNITED STATES PATENT OFFICE.

CHARLES A. HARTLEY, OF SILVERTON, AND JESSE R. MERO, OF SALEM, OREGON.

GRADER.

Application filed November 13, 1922. Serial No. 600,707.

*To all whom it may concern:*

Be it known that we, CHARLES A. HARTLEY and JESSE R. MERO, citizens of the United States, residing, respectively, at Silverton and at Salem, both in the county of Marion and State of Oregon, have invented certain new and useful Improvements in Graders; and we do declare the following to be a full, clear, and exact description of the same, reference being had to the accompanying drawings and to the characters of reference thereon.

Our invention relates to apparatus for separating or grading lump articles, including fruits, vegetables and the like according to size and has for an object to provide a practical, efficient and widely applicable machine for this purpose.

Other objects of the present invention are: to provide a single type of apparatus adapted to grade accurately, efficiently and satisfactorily, berries, orchard fruits, gourds, bulb roots, tubers, nuts and other widely diversified objects and materials; to provide a grader that may be adapted to simultaneously grade and wash the material supplied thereto; to provide a machine so organized that it may be manufactured, sold or used on a single or multiple unit system; to provide a machine inherently adjustable for grade sizes and other variable conditions; to provide a machine that is simple, rugged, reliable and compact; and to provide a rapid grader that avoids bruising or other injury to the material handled and that requires very little attention.

To these and other ends our invention consists in a fruit and vegetable grader, a single embodiment of which is herein described and illustrated in the drawings, wherein:

Figures 1 and 2 are, respectively, front and rear portions of a right end elevation of a machine organized and constructed in accordance with our invention, the elevator being removed and certain fragmentary details apparent from the specification or elsewhere shown being omitted for the sake of clearness;

Figure 3 is a front elevation of the machine, the lower portion of the elevator being broken away;

Figures 4 and 5 are respectively, rear and front portions of a longitudinally contracted sectional elevation, on an enlarged scale taken at the offset line IV—IV looking from right to left of Figure 3;

Figure 6 is a fragmentary sectional elevation on an enlarged scale, taken at the offset line VI—VI—VI'—VI' looking from left to right of Figure 1;

Figure 7 is a contracted plan elevation of the grading roll system of the upper tier and associated mechanism and parts, the superposed portions of the machine being removed to expose this view;

And, Figure 8 is a perspective schematic view of a system of chain drives for interactuating the grading roll rear counter shafts and the head shafts of the return and cull discharge conveyors.

Similar reference characters denote the same parts throughout the drawings.

Referring now in detail to the specific embodiment of our invention shown in the drawings, the frame of the grading machine per se is shown built up of wood and organized on a sectional plan. The front panel is an individual part comprising the posts 1 and 2, a head rail 3 trimmed with a cornice 4, a foot rail 5, an upper bolster embodying the shelves 6 and 7 and the struts 8, and a lower bolster embodying the shelves 9 and 10 and the struts 11. The whole panel is rigidly united and is braced by the bolster construction in conjunction with the tie rods 12 and 13. The rear panel of the frame is substantially identical to the front panel, the bolsters, however, being set higher than the corresponding members of the front panel in order to pitch the roll mechanism frontwardly, in the direction of travel or flow of the objects being graded. The reference characters denoting the elements and members of the rear panel of the machine frame are accordingly the same with the addition of a prime mark, thus: posts, 1', 2'; head rail 3'; cornice 4'; foot rail 5'; upper bolster shelves 6' and 7' and struts 8'; lower bolster shelves 9' and 10', and struts 11'; and the tie rods 12' and 13'.

The side panels of the frame are both similar also. They each embody respectively a head rail 14 and 14', foot rails 15 and 15', front stanchions 16 and 16', rear stanchions 16$^a$ and 16$^{a'}$, and the rhomboidally disposed diagonal braces 17 and 17'. These panels are each individually united into a rigid structure, the braces being either adapted to be stressed in compression by central intersecting tie rods (omitted to more clearly disclose the mechanism of the machine) or they may of course be inherently adapted to resist stresses both in tension and in compression. These panels may each be trimmed with a cornice 18 and 18' to carry out the lines of the front and rear panels.

The frame sections are preferably assembled to be rigidly and permanently set up and yet demountable at will. The ends of the head and foot rails of the side panels may be doweled or mortised to corresponding portions of adjacent posts of the front and rear panels and securely fastened together by bolts or tie rods as indicated at 19 and 20. Suitable horizontally disposed diagonal bracing, preferably inserted in the planes of each the head and foot rails, complete the constrainment of the frame. It will be observed that the various parts and fittings mounted on and incorporated with this frame do not interfere with the demountability of the machine and further that the setting up of a group of machines such as illustrated in gangs is facilitated by the features of construction herein described and also that the organization of single or multiple units of mechanism is conveniently provided for.

The grading roll mechanism in its most elementary form consists in a pair of rolls arranged in spaced relation side by side and adapted to receive a supply of assorted sizes of the material to be graded at one end, which objects are arranged in single file in the trough between the rolls and during their passage along this open bottomed trough, those of the objects that are sufficiently small, drop through the opening between the rolls whereas the larger ones pass along the rolls and are discharged at that end of the rolls opposite to the end at which they were received. To facilitate this modus operandi the rolls are tilted from the receiving end toward the discharging end, they are rotated about their longitudinal axes in opposite directions so that their contiguous sides are continuously moving upward and away from the throat of the trough, and corresponding helical propelling elements are wrapped around or project from the peripheries of the rolls to positively impel the material from the receiving end toward the discharge end of the trough formed by the rolls. By setting the roll centers at different distances apart the mechanism will evidently be adjusted to alter the limiting dimensions of any object that will pass through between the rolls and accordingly also the limiting dimensions of those objects which may be carried by the rolls and delivered at the discharge end.

In the machine illustrated in the drawings, there are sixteen rolls arranged in four tiers, a double pair of rolls constituting each tier. Increasing the number of tiers increases the number of different grades which the machine can separate, this number being always one more than the number of tiers; whereas the number of pairs of rolls governs the capacity of output of the machine. A most economical, efficient and convenient system of construction is inherent in the machine specifically set forth, the tiers of rolls therein being organized in groups of twin or double pairs, two adjacent rolls being mounted with fixed axes and two remote rolls mounted with laterally adjustable axes. It will become apparent that this machine may be organized as a single tier of four rolls or any multiple thereof, or may include any number of tiers desired. And with slight modification, by omitting the central twin pair of rolls having fixed axes and mating the outer pairs, a section or tier may be organized that embodies single pairs of rolls.

The roll mechanism of each of the four tiers being identical, a single set of reference characters will suffice. The bodies 21, 22, 23 and 24 of each of the rolls may be either metal or wooden and may be covered with a rubber jacket. In the present instance they are plain wooden rolls provided with a ferrule 25 at either end. The rolls 21 and 23 are designed to rotate in a counter-clockwise direction as viewed from the front of the machine and each of these rolls has embracing its periphery for its entire length and substantially integral therewith a left hand helical impelling bead 26. These rolls may be further referred to as left hand outer and left hand inner rolls, respectively. The rolls 22 and 24, on the other hand are designed to rotate in a clockwise direction and are correspondingly provided with a right hand helical impelling bead 27. They my be referred to as right hand inner and outer rolls respectively. Each of the rolls is provided with a concentric substantially integral front end spindle, 28, 29, 30 and 31 respectively, and also with the respective concentric substantially integral rear end spindles 32, 33, 34 and 35. The spindles, bodies and beads are thus united each set as a rigid concentric rotatable system constituting at once a roll and a screw conveyor. The spindles of these rolls are journalled in the bearing boxes 36 which are formed with spherical waists and cylindrical ends and the adjustable collars 37 and 38 are provided on the front spindle of each roll as thrust bearings. The bearing boxes of the inner rolls are mounted in turn in the stationary twin bearing mountings, whereas the boxes of the outer rolls are mounted in the shiftable bearing carriers, as best shown in Figures 4, 5 and 7.

The twin bearing mountings each embodies a base 39 clamped or bolted rigidly one above and midway of each of the bolsters and one beneath and midway of each of the bolsters. That is, a base 39 is rigidly secured to the upper side of each of the shelves 6 and 6' and 9 and 9' and also to the under side of each of the shelves 7 and 7' and 10 and 10', and since these bases are in line the common studs 40 may be used for both fastening the studs to the bolsters and for stressing the latter to hold them rigidly in shape. Each of the bases 39 is provided with a pair of spherical seating sockets 41 for receiving the ball shaped waists of the bearing boxes held thereby in fixed spaced relation and co-operating with these seating sockets is a correspondingly socketed two armed yoke 42 which is drawn toward the mating base by a cap screw 43. A self alining ball and socket bearing is thus provided for the inner rolls which nevertheless locates and constrains the latter.

The shiftable bearing carriers each embody a base 44 mounted on the rotatable and axially adjustable guide bars 45 and 46 as described below. A spherical seating socket 47 for receiving the ball waist of the bearing box carried thereby is formed on each of the bases 44 and co-operating with this seating socket is a correspondingly socketed and alined cap including a plunger 48 passing through a bore in the head end 49 of an overhanging arm 50 integral with the base 44, and a flange 51. The end of the plunger being socketed to engage with the waist of the bearing box, it is drawn toward the seat 47 by cap screws 51ª passing through the flange 51 and threaded into the overhanging arm of the carrier. The plunger being alined by and axially movable within the bore through the head 49, ample movement of the plunger in its adjustment for loosening or clamping the bearing box is provided for in order to permit the convenient removal or replacement of the latter.

The range of corresponding movement or adjustment of the yoke 42 is also made ample for the same reason by providing cap screws 43 of ample length. It will later be observed that since the bearing box mountings and carriers are definitely located with relation to the frame of the machine and that the bearing seatings although self alining for all the conditions met with are of the ball and socket type, the rolls may be removed and replaced conveniently and at will, inasmuch as the front spindle bearing boxes situated between the thrust collars provide a very satisfactory locating criterion for the rolls. Lubrication of these bearings may be conveniently provided for through the sockets in the yokes 42 and plungers 48, grease cups being mounted on these members in practice and ducts provided to convey the lubricant into the adjacent spherical sockets and from thence to the rubbing surfaces of the bearing. It will be further noted that in the first and third tiers, the bearing box mountings and carriers are upright, whereas in the second and fourth tiers these fixtures are inverted.

The adjustable guide bars 45 and 46 for supporting constraining, locating and traversing the shiftable bearing carriers for the bearing boxes of the outer rolls extend from one end of the machine to the other and are independently operable. In the present machine there are eight pairs of these bars, one pair for each set of bearing mountings and carriers. The forward bar 45 of each pair projects from the right side of the machine whereas the hinder bar 46 projects from the left side of the machine and at their projecting ends these bars are screw threaded into the guide bar blocks 52 and 53, 54 and 55 respectively. The extremity of these threaded ends 45' and 46' are squared as indicated by the numerals 56 and 57 to receive a wrench or handle for threading the bars to the right or to the left in effecting the traversing adjustment thereof and a lock nut 58 is provided for each of the guide bars for setting its adjustment. The body portion of each of the guide bars pass freely through and are journalled in the bases 39 and 44 of the twin bearing mounting and shiftable bearing carriers, respectively, and the ends of these body portions enter and are journalled in the corresponding guide bar blocks as shown most clearly in Figure 7. It will be understood that the bases 44 of the carriers clear the adjacent portions of the machine frame and thus when the collars 59 and 60 are rigidly secured in their proper adjusted positions on the guide bars 45 and 46 at the opposite ends of the right and left pairs of shifting bearing carrier bases 44, respectively as shown in Figures 3 and 7; the mounting, supporting and constrainment of the carriers is complete and free from interference. It is therefore clear that when the bars 45 are threaded along in either direction the corresponding right hand outer roll bearing carrier will partake of the longitudinal movement of the guide bar 45, and, similarly the corresponding left hand outer roll bearing carrier will partake of the longitudinal movement of the guide bar 46 when the latter is threaded along in either direction. The traversing movement and accordingly the spacing or separation adjustment of the outer rolls with respect to the inner rolls is thus obtained and effected, one end of each roll (or in a multiple section machine each corresponding roll) being shifted at a time and in order to facilitate the setting of the rolls the scales 61 secured to the face of the bolsters and the co-operating indexing pointers 62 secured to and carried by the bases 44 of the shifting bearing carriers are provided as best shown in Figure 3. Obviously the reading or legends on the scale may be designed to meet whatever requirements that may be regarded as a criterion in setting the spacing of the rolls of the machine. The lower limits of the grade to be discharged over the roll as related to the separation thereof is suggested as an example.

In order to conduct the material to be graded into the proper troughs between the co-operating rolls, to arrange the individual pieces or articles in line and to prevent their bobbing off or being thrown from or between the inturning roll surfaces, suitable sloping guards or fenders are provided. A dihedrally angular twin fender 63 spans the inner pair of non-traversable rolls 22 and 23 from crown to crown and extends from the receiving end to the discharge end thereof. The manner of mounting this fender is best shown in Figures 4, 5, 6 and 7, attention being called to the fact that although the fender 63 is in all four tiers secured to a fender bar 64 by means of the fender irons 65, the attachment of the fender bar 64 to the base 39 of the twin bearing mounting is different in detail when this base is erect as in tiers one and three from the arrangement employed when the bases are inverted, as in tiers two and four. In the former case as clearly shown in Figures 4, 5 and 7, the front end of the fender bar is fastened in the eye of a vertically disposed elbow bracket 66 having a laterally extending shank entering and securely clamped within the inclined socket 67 formed integral with the base 39. At its rear end, the fender bar 64 is similarly attached to the adjacent base 39 by means of the elbow bracket 68, the latter being appropriately shaped and proportioned to accommodate the reversed position of the base 39. For tiers two and four, the rear end of the fender bar 64 is inserted and clamped directly within the socket 67 of the base 39 whereas the front end of the fender bar is clamped by means of a collar 69 within the semicircular concave shell of the adapter 70 having a shank fitting into and clamped within the socket 67 of the adjacent base 39.

Each of the outer rolls 21 and 24 is provided with a sloping fender panel 71 carried by means of the fender brackets 72, to which it is secured, on an outer fender bar 73 which in turn is attached at either end to corresponding shiftable bearing carriers. Inasmuch as this bar extends in the horizontal axial plane of the roller system, the mounting is uniform in all tiers. As best shown in Figures 1, 2, 3 and 7 the ends of the fender bar 73 terminate in flat springs 74 disposed in a vertical plane parallel to the axis of the corresponding roll and are directly bolted to the bosses 75 formed at the back of each of the overhanging arms 50 by the cap screws 76. This spring mounting provides ample rigidity to the fender bar and yet provides the resiliency needed in lieu of a swivel connection to permit the bearing carriers to be shifted laterally independently of one another.

The fruit or other material to be graded may be supplied to the top tier of rolls either directly or by means of a supply conveyor system which may include an elevator. The material received by the rolls is then divided into that portion which remains supported and is accordingly discharged at once from the machine and that portion which, passing thru between the rolls, is transferred to the next succeeding tier of rolls below where the same process of separation for the following grade occurs. The succeeding tiers of rolls are each set with successively diminished interspaces until finally at the last tier, that material dropping between the rolls is forthwith discharged in toto from the machine.

The elevator embodies a belt 77 provided with flights 78 passing over a head pulley 79 which is rigidly mounted on a head shaft 80 journalled in a pair of self alining bearing boxes such as 81 or 150 or 36 (which may all be identical thruout the drawings excepting, perhaps, for their bore) and these boxes are mounted in ball and socket adjustable plummer blocks such as 82 (which likewise may be identical thruout the machine) fastened to the head blocks 83 of the elevator frame 84. The elevator head is connected in the machine by a U frame 85 the end rail thereof being pivotally and adjustably secured to the elevator frame where the head blocks and side rails of the latter meet, the elevator may thus be shifted laterally to register with the supply conveyor belt 86. The side rails of the U frame 85 are securely clamped within the post brackets 87 to be longitudinally adjustable therein and thus the elevator head may be bodily shifted closer to or further from the head pulley 88 of the supply conveyor. The foot end of the elevator may be provided with a receiving spout or hopper and also may have legs adapted to rest upon the floor. The mounting of the foot or idler pulley may be substantially the same as the construction at the head end and thus the adjustment provided by the plummer blocks will prove ample for both pulley setting and belt tension.

The supply conveyor extends from side to side across the top of the machine in a trough mounted on the head rails 14 and 14'. The belt 86 of this conveyor passes around the head pulley 88 and the idle pulley 89 mounted respectively on the head and tail shafts 90 and 91, these shafts being journaled in the bearing boxes 81 of the plummer blocks 82 secured to the cleats 92 and 92'. The upper course of the belt 86 upon which the material is carried slides over the table 93 forming the bottom of the trough formed by the shrouds 94 and 95 curbing the sides of the belt. Through the shroud 95 is formed a gateway 96 provided with an adjustable hinged swiper gate 97 adapted to sweep material from the belt 86 into the inclined spout comprising the sides 98 and 99, a bottom 100 and an end wall 101. This spout is securely attached at its receiving end to the trough of the supply conveyor and its outlet end is arranged to discharge directly to the receiving ends of the roll pairs 21, 22 and 23, 24 without obstructing the flow path. The mouth of the spout opening directly over the dihedral central fender 63, the latter divides the stream of material from the spout and distributes the stuff equally to the pairing rolls.

When a single twin unit section machine, such as illustrated, is set up, there being but one gateway in the supply conveyor trough, the swiper gate will extend diagonally across the trough from side to side. But when a multi-section machine is constructed a single supply conveyor functions for the entire set of sections, a gateway being provided at each section with an individual swiper for each, and then these swiper gates are set to extend only partially across the conveyor belt 86 and each of them sweeps an appropriate portion of the conveyed material from the belt 86 to each section of rolls. On the other hand, it is merely necessary to close any one or more of the hinged swiper gates, which are adapted to be adjustably secured in any position, in order to cut off the supply to any vertically organized section of the machine.

The discharge conveyors for the graded material spilled over the forward ends of each of the four tiers of rolls, are each substantially uniform. These conveyors each embody a belt 102 passing around the head pulley 103 and also around the idle pulley 104; and like the supply conveyor belt, the discharge conveyor bands extend from end to end of the machine, whether the latter consists of one or many such sections as shown in Figure 3. The head pulleys 103 of discharge conveyors number one, three and four counting from the top of the machine are each mounted rigidly on a head shaft 105, whereas the head pulley of discharge conveyor number two is mounted directly and rigidly upon an extension of the counter shaft 106 for driving the discharge conveyor system. The idle pulleys 104 are each rigidly mounted on a tail shaft 107.

These shafts are all journalled in bearing boxes 81 mounted in plummer blocks 82, the latter being secured to the vertically extending posts and stanchions: 1, 2, 16, 16' and 1'. The plummer blocks carrying the counter shaft 106, however, is blocked out by suitable cleats to increase the clearance necessary for its driving gearing.

The conveyor belts 102 are shrouded by the sills 108, 109, 110, 111, and by the vertical skirts depending from the sloping shields 112. The latter are secured to brackets 113 clamped to the stringer bars 114 rigidly carried by the arms 115 extending from the heads of the plummer blocks 116 in which the bearing boxes 81 of the tail shafts 117 are mounted.

Upon these tail shafts are rigidly mounted the idle pulleys 118 of the three return conveyors extending from front to rear respectively of the first three roll tiers, counting from top to bottom; and the idle pulley 118 of the cull discharge conveyor extending beneath the lower or fourth tier of rolls, from the front end thereof out beyond the rear panel of the machine. The return conveyors each embody a belt 119 passing around one of the idle pulleys 118 and also around a head pulley 120 rigidly mounted on a head shaft 121 journalled in bearing boxes 81 mounted in plummer blocks 82 secured to the rear stanchions 16ª and 16ª' of the frame. The cull discharge conveyor includes a belt 122 passing at one end around the lower idle pulley 118 and at its other end embracing the head pulley 123 fixed to the head shaft 123ª journalled in bearing boxes 81 carried by plummer blocks mounted on the posts 1', 2' of the frame.

Each of the return conveyors is housed within an under-pan formed with side walls combining a sloping deflector panel 124 and a vertically depending skirt 125, a rearwardly sloping front end wall 126, a rear end wall 127, and an arcuate apron 128 hinged to the latter. These underpans are interposed between each roll tier and its return conveyor (the last roll tier and its cull discharge conveyor being a special case and thus an exception in detail). The sloping front end wall and the deflector panels co-operate to collect the material dropping through from between the superposed roll tier and deliver it to the rearwardly travelling upper band of the belt 119, the skirts shroud the latter, and, the rear end wall and its apron which surrounds the head pulley 120 and straddles the central fender 63 of the next succeeding tier of rolls insures the proper delivery of the material carried by the belt 119 to the receiving end of the underlying roll tier. Thus is the transfer of under-sized material forthwith transferred from one roll tier to the next tier below.
The under-pans are each securely strapped to rails 129 which rest at their front ends upon the stringer bars 114 and at their rear ends upon stringer bars 130, the first and third thereof being strapped to the adjacent bolster of the frame whereas the second stringer bar 130 is rigidly mounted in a post bracket fastened to the frame. As clearly shown in Figures 4 and 5, dowel pins 131 may be provided in the stringer bars 114 and 130 and corresponding holes drilled in the rails 129 to locate and retain the underpans in place.

The cull discharge conveyor is housed in an under-pan similar to that environing the return conveyors. The front end wall 132, the deflector panels 133 and the skirts 134 are substantially the corresponding elements 126, 124 and 125 of the return conveyor under-pans. However the rear end of the cull discharge under-pan is open and unobstructed, the side walls thereof are longer in correspondence with the belt 122, and the positioning and mounting of this under-pan is somewhat different than are the others. The manner of attachment of the rails 135 to the panels 133 and their connection to and support on the lower stringer bar 114 may correspond to that of the rails 129, but at their rear ends, the rails 135 are united as a sort of upturned U frame and through the tubular transverse member connecting the upturned portions 136 of the rails 135 and spanning the open end of this under pan and its belt 122, passes the lower rear stringer bar 137 strapped to the rear posts of the machine frame.

The power transmission, actuating or drive system of the machine illustrated includes the roll drives, the drive for the supply conveyor and elevator, the discharge conveyor drive, the return and cull conveyor drive, and the interconnection of these drive systems.

On the front ends of the front spindles 28 and 30 of the left hand rolls 21 and 23 are rigidly but adjustably mounted the crown or bevel gears 138 and 139 respectively and on the rear ends of the rear spindles 33 and 35 of the right hand rolls 22 and 24 are similarly mounted the crown or bevel gears 140 and 141. The intermeshing spur gears 142 and 143 are rigidly but adjustably mounted on the rear spindles 33 and 34 of the central pair of rolls and thus, with the front and rear counter shafts 144 and 145 upon which are mounted the fixed bevel pinions 146 and 147 and the slidable bevel pinions 148 and 149, respectively, the roll mechanism of each tier is organized as a system. The front and rear counter shafts are each journalled in bearing boxes 150 carried by plummer blocks 82 mounted on the frame posts 1, 1', 2, 2'. The fixed bevel pinions 146 and 147 are pinned or otherwise rigidly secured to the shafts 144 and 145 in position to co-operatively mesh with the bevel gears 139 and 140 of the central rolls 22 and 23, respectively. The slidable pinions 148 and 149 are mounted on the shafts 144 and 145 in engagement with the feather keys 151 and 152, whereby they are nonrotatable about but adapted to be axially adjustable along their respective shafts, and these pinions are clamped in position to co-operatively mesh with the bevel gears 138 and 141 of the outer rolls 21 and 24, by means of the set screws 153 and 154 passing thru the collars 155 and 156 embracing the inner hubs of the pinions 148 and 149. The collars 155 and 156 overlap the inner side of the projecting tooth ring of the bevel gears 138 and 141 and thus since the conical form of the tooth surfaces of the adjacent intermeshing bevel gears and pinions, in effect overlap these gears peripherally, the slidably adjustable bevel pinions are yoked in mesh with their co-operating bevel gears during the process of shifting the outer rolls and their gearing for adjusting the grade setting of this mechanism.

The drive for the supply system including the elevator and the superposed supply conveyor, includes a countershaft 157 journalled in bearing boxes 81 carried in plummer blocks 82 mounted on the frame post 1' and stanchion 16. These plummer blocks are set on cleats 158 and 159 whereby clearance for the crown or bevel gear 160 rigidly but preferably adjustably secured to the end of the supply drive counter shaft 157 with which gear meshes the bevel pinion 161 rigidly mounted on the overhanging adjacent end of the rear bevel gearing roll drive countershaft 145 of the upper roll tier, is provided. The bevel pinion 161 may be reversed end for end and secured to its shaft in position to oppositely mesh with and drive its engaging gear 160. This is convenient when it is desired to place the elevator at the other end of the machine although of course the whole drive may be transferred to the other end of the machine. A chain 162 embracing the corresponding sprockets 163 and 164 rigidly secured to the shafts 157 and 90 respectively, and another chain 165 embracing the sprocket pinion 166 and the corresponding sprocket gear 167 rigidly mounted respectively on the head shafts 90 and 80 of the supply conveyor and elevator: completes the supply system portion of the drive transmission of the machine.

The discharge conveyor drive is similar. Rigidly mounted on the rear end of the discharge conveyor countershaft 106 is a crown or bevel gear 168 and enmeshed with this gear is a bevel pinion 169 rigidly secured to the adjacent overhanging end or extension of the rear bevel gearing roll drive countershaft 145 of the third roll tier. The bevel pinion 169 like the pinion 161, may be reversed end for end and secured to its shaft in position to oppositely engage with and drive its co-operating gear 168, and thus the direction of travel of the discharge conveyor belts 102 may be reversed thereby delivering the graded material from the opposite end of the machine. A chain 170 embracing the corresponding sprockets 171 and 172 rigidly mounted on the countershaft 106 and the head shaft 105 of the upper discharge conveyor communicates the drive to the latter; and the successively arranged chains 173 and 174 embracing respectively the corresponding pairs of sprockets 175 and 176, 177 and 178 rigidly mounted as shown on the countershaft 106 and the head shafts 105 of the third and fourth discharge conveyors; completes the discharge conveyor portion of the drive transmission system.

It is apparent from Figure 7 that each tier of rolls and its pairing front and rear bevel drive countershafts 144 and 145 are geared together as a complete unit of the drive or transmission system. It has also been shown that the supply conveyor and elevator, and the discharge conveyors are geared to receive their drive from the upper and third roll tiers. The various roll tiers and the return and cull discharge conveyors remain to be inter-connected in order to unite the various sections or mechanisms of the machine into a mechanical system having a centralized drive. To this end we may utilize the rear countershaft 145 of the third roll tier as the main driving shaft of the machine and conveniently employ the interconnecting chain drive illustrated in Figure 8.

A main driving pulley 179 may be rigidly mounted on the overhanging left end of the main driving shaft as shown in Figure 2 and from this shaft the drive shown in Figure 8 originates. This drive is viewed, as shown in the drawing, perspectively from the right rear corner of the machine looking toward the front left corner thereof.

This drive embodies four triangular chain systems embodying respectively the endless linked chains 180, 181, 182 and 183 and the correspondingly co-operating toothed sprocket pinions and wheels: 184, 185, 186; 187, 188, 189; 190, 191, 192; and 193, 194, 195. The toothed pinions and wheels are all rigidly mounted on their respective shafts as shown in Figure 8 and the various chains link the pinions and wheels together as a positive drive. The adjustment for tensioning the chains is provided by the adjustability of the plummer blocks 82 and their boxes in which the various shafts shown in Figure 8 are mounted as previously shown and described. No idlers are required in this chain system and the open arrangement of the chain courses preserve the characteristic accessibility of all operating parts of the machine.

Preparatory to operating the machine, the grading rolls of each tier are traversed by the guide bar screws to set them with the appropriate inter-space separation. Thus assuming the machine to be installed in a fruit cannery and about to be used for grading fruit: The rolls of the first or upper tier which are to deliver "fancy" grade to the first or upper discharge conveyor and to pass "choice" and all succeeding grades, are traversed and set by their guide bars until the indexing pointers of that tier register with the numerals or other legend of their co-operating scales corresponding to "choice" grade. The rolls of the second tier which are to deliver "choice" and pass "standard" and succeeding grades are set to "standard"; the rolls of the third tier are set to "sub-standard"; and the rolls of the fourth or bottom tier are set to "water pack".

The machine is now set in operation by continuously rotating the drive pulley either from an external or a self-contained source of motive power and the fruit to be graded is supplied to the elevator. The manner in which the fruit is handled and operated upon has already been explained and various suitable methods of receiving the graded fruit as delivered by the discharge conveyors will be obvious. When it is desirable to wash the fruit, the machine may be set over a drain and piped to spray or flood the fruit with water as the fruit passes through the machine. It will be seen that the organization of this machine is such as to conveniently include the process of washing.

The modification or development of this machine to embody fewer tiers or fewer sets of rolls or to include a larger number of roll tiers or a greater number of roll sets, is presumed to be well within the scope of our present invention and sufficiently evident without further description, inasmuch as the elements, parts and combinations shown are thus either contracted or expanded. The unit construction and interchangeable part plan upon which the present embodiment of our invention is shown greatly enhances the possibilities in these directions in addition to providing a more tolerant, versatile, efficient and economically produced construction. Furthermore the machine shown is readily demountable and may be quickly, conveniently and accurately reassembled. This latter feature is of importance not only in transporting and storing of the machine, but also for sanitary reasons and in the care and upkeep of the machine.

Having thus fully described our invention, what we claim and desire to secure by Letters Patent of the United States is:

1. In a grader, the combination of a pair of rotatable elongated rolls arranged side by side and spaced apart to form therebetween an open bottomed open ended trough adapted to receive material to be separated and to permit said material to travel longitudinally thereof, whereby the smaller elements of the material may pass thru between said rolls and the larger elements may discharge endwise therefrom, means for gathering the material passing thru between the rolls and means for collecting the material discharged endwise from said rolls and means for rotating the rolls in opposite directions with their adjacent peripheral elements travelling upwardly.

2. In a grader, the combination of a pair of cylindrical rolls of uniform diameter throughout their length, a continuous spiral band threaded about the periphery of each of said rolls, said band being narrow with respect to the spaces separating the convolutions thereof and projecting from the roll periphery as an integral portion thereof, a pair of spindles for each of the rolls, journal bearings for said spindles, said bearings being disposed to support the pairing rolls in parallelism and spaced apart to form an open bottomed open ended trough therebetween, means for rotating the rolls, a conveyor arranged at one end of said rolls, and conveying means disposed beneath the roll interspace, fenders co-operating peripherally with the rolls, a fender bar for each of the fenders substantially co-extensive with the rolls in the axial direction of the latter, a common support for demountably holding each of the journal bearings of the rolls and the corresponding end of the fender bar of the adjacent fender, means for laterally traversing the supports for one roll and its fender relatively to the other and means for driving the rolls.

3. In a grader, the combination with a plurality of tiers of elongated rolls; a plurality of conveyors disposed transversely of said rolls, a plurality of conveyors disposed longitudinally of said rolls, and journal bearings and supporting elements for said mechanism, of a frame embodying a plurality of sub-assembly units comprising a front panel, a rear panel, and a plurality of transverse panels, said bearings and supporting elements being mounted on and positioned by the adjacent and corresponding frame panels, and said panels with their respective bearing and supporting elements being adapted to be repeatedly assembled and disassembled without disturbing the members integral therewith.

4. A grader according to claim 3 having a sub-frame for the roll bearings comprising a pair of shiftable guide bars mounted on each the front and the rear frame panels.

5. In a grader, the combination of a plurality of rotatable elongated cylindrical rolls arranged in groups of four rolls side by side extending substantially horizontally and in parallelism, the two inner rolls of each group being mounted in relatively fixed bearings and the two outer rolls being mounted in literally shiftable bearings whereby the outer rolls may be traversed with respect to the inner rolls to adjust the interspacing thereof, means for traversing said rolls, means for rotating the rolls, conveying means disposed at the terminal ends of said rolls, and conveying means disposed beneath the roll interspaces, fender means co-operating with each roll, said fenders being mounted at either end in unison with the bearings of their respective rolls.

6. In a grader, the combination of a plurality of rotatable elongated cylindrical rolls arranged in groups of four rolls side by side extending substantially horizontally and in parallelism, the two inner rolls of each group being mounted in relatively fixed bearings and the two outer rolls being mounted in laterally shiftable bearings whereby the outer rolls may be traversed with respect to the inner rolls to adjust the interspacing thereof, means for traversing said rolls, means for rotating the rolls, conveying means disposed at the terminal ends of said rolls, and conveying means disposed beneath the roll interspaces, a single dihedral fender common to and spanning the inner rolls, said fender being mounted at its ends in unison with the bearings of the co-operating adjacent rolls, and an individual single panel fender for each of the outer rolls, said last named fenders being each carried at its ends in unison with the shiftable bearings of its respective roll.

7. In a grader of the class described, the combination with a pair of cylindrical rolls each having a journal bearing at either end, a support for each of the journal bearings adapted to position the rolls side by side in spaced relation whereby a trough open at the bottom and endwise is formed therebetween, and a mounting for the bearing supports adapted to permit the shifting thereof to adjust the interspacing of the rolls, of a fender co-operating peripherally with each of said rolls, a supporting member for each of the fenders terminating at either end in the vicinity of the corresponding bearing support, and a flexible connection interposed between each terminal of the fender supporting members and the adjacent bearing support, whereby the former is attached to the latter.

8. In a grading machine, the combination with a plurality of rotatable elongated cylindrical rolls arranged in groups of four rolls side by side extending substantially horizontally and in parallelism, the two outer rolls co-operating in adjustable spaced relation with the two inner rolls whereby a trough open at the bottom and endwise is formed therebetween, said co-operating rolls being adapted to receive material to be separated, to permit the passage therebetween of the smaller elements of said material and to discharge endwise the remainder of the material, of means for removing the material discharged by the rolls from the machine, a conveyor common to said group of rolls disposed thereunder and extending longitudinally thereof, and an under-pan interposed between the rolls and said conveyor, said under-pan subtending the group or rolls and housing the conveyor.

CHARLES A. HARTLEY.
JESSE R. MERO.

Witnesses:
GEORGE ALLEN PAGE.
RUTH E. WALLACE.